United States Patent [19]
Langlois

[11] Patent Number: 5,727,603
[45] Date of Patent: Mar. 17, 1998

[54] METHOD FOR PREVENTING FUEL SPILLAGE

[75] Inventor: Joseph R. Langlois, Coral Springs, Fla.

[73] Assignee: L N G & K, Inc.

[21] Appl. No.: 646,944

[22] Filed: May 8, 1996

Related U.S. Application Data

[60] Division of Ser. No. 262,628, Jun. 20, 1994, Pat. No. 5,515,891, which is a continuation-in-part of Ser. No. 910,619, Jul. 8, 1992, Pat. No. 5,322,099.

[51] Int. Cl.⁶ .................................................. B63B 17/00
[52] U.S. Cl. .................................................. 141/1; 141/7
[58] Field of Search .......................... 141/44–46, 52, 141/53, 59, 86, 88, 98, 297, 95, 301–305, 307, 308, 325, 326, 1, 7, 286; 220/86, 2, 746; 114/343; 137/199–202, 572, 587

[56] References Cited

U.S. PATENT DOCUMENTS

| | | | |
|---|---|---|---|
| 3,133,564 | 5/1964 | Hunter | 141/286 |
| 3,187,935 | 6/1965 | Lense | 220/86.2 |
| 3,291,165 | 12/1966 | Fraylick | 141/286 |
| 3,857,350 | 12/1974 | Rohan | 137/572 X |
| 3,915,184 | 10/1975 | Galles | 220/746 X |
| 5,205,330 | 4/1993 | Sekine | 141/59 |
| 5,230,372 | 7/1993 | Westphal | 141/86 |

Primary Examiner—J. Casimer Jacyna
Attorney, Agent, or Firm—McCormick, Paulding & Huber

[57] ABSTRACT

An apparatus is provided for preventing the spillage of fuel into the water or onto a marine vessel when filling a fuel tank on the vessel. A vent line is coupled between the fuel tank and a vent port of the vessel, at least one valve assembly is coupled within the vent line, and an overflow container is coupled within the vent line between the valve assembly and the vent port. The valve assembly defines a drain hole for permitting small quantities of fuel, gases and/or vapors to pass through the valve assembly and into the overflow container. A fill container defines an inlet port for receiving a fuel nozzle to fill the fuel tank with fuel, and an outlet port coupled in fluid communication with a fill line for the passage of fuel between the fill container and the fuel tank. A by-pass line is coupled between the fill container and the overflow container for the passage of overflow fuel through the fill container, and an indicator system is mounted within the fill container for signaling to an attendant when the fuel tank is filled. Upon filling the fuel tank with fuel, the overflow fuel backs up into the fill container, and in turn flows through the by-pass line and into the overflow container. The backed-up fuel also activates the indicator system for signaling to the attendant to turn off the fuel nozzle, and the drain hole permits the backed-up fuel in the fill container and fill line to drain downwardly into the fuel tank.

6 Claims, 6 Drawing Sheets

METHOD FOR PREVENTING FUEL SPILLAGE

CROSS-REFERENCE TO RELATED APPLICATION

This patent application is a divisional of application Ser. No. 08/262,628, filed on Jun. 20, 1994, now U.S. Pat. No. 5,515,891, which is a continuation-in-part of U.S. patent application Ser. No. 07/910,619, entitled "APPARATUS FOR PREVENTING FUEL SPILLAGE", filed on Jul. 8, 1992 in the name of Joseph R. Langlois, now U.S. Pat. No. 5,322,099.

FIELD OF THE INVENTION

The present invention relates to fuel systems and, more particularly, to methods for preventing spillage from fuel systems, such as fuel systems on marine vessels.

BACKGROUND INFORMATION

A typical vessel with an inboard fuel tank has a fuel port located on the deck, which is coupled by a fuel inlet line to the fuel tank (below deck) for filling the tank with fuel. At least one vent line is also typically coupled on one end to the fuel tank and coupled on the other end to a vent port, which is located below deck but above the water line of the vessel. The vent port is provided to permit fuel vapors to escape from the fuel tank and also to permit any excess fuel (e.g., when filling the fuel tank, when there is thermal expansion of the fuel, or agitation of the fuel in rough seas) to flow out of the tank. When filling such prior systems with fuel, the attendant typically determines when the tank is full by watching the vent port to see when the fuel begins to flow through the vent port into the water. This is a major cause of water pollution in marinas.

It is an object of the present invention to overcome many of the drawbacks and disadvantages of prior fuel systems.

SUMMARY OF THE INVENTION

The present invention is directed to an apparatus for preventing fuel spillage on a marine vessel. The apparatus comprises a vent line coupled between a fuel tank and a vent port of the vessel and at least one valve assembly coupled within the vent line for preventing an overflow of fuel from the fuel tank from passing through the vent port into the water. A vent container or overflow reservoir is coupled between the valve assembly and the vent port of the vessel for collecting any fuel and/or vapors passing through the valve assembly. The apparatus further comprises a fill container defining a first aperture for receiving a fuel nozzle to fill the fuel tank with fuel, and a second aperture for coupling the fill container in fluid communication with the fuel tank to permit fuel to pass between the fill container and the fuel tank and to collect excess fuel within the fill container upon filling the fuel tank with fuel.

The valve assembly defines a first fluid passageway between inlet and outlet ports, and includes a first valve member for preventing the passage of fluid through the first fluid passageway in response to the flow of fuel into the valve assembly. In a preferred embodiment of the present invention, the first valve member is a ball valve. The valve assembly preferably also includes a second valve member for opening a second fluid passageway between the inlet and outlet ports in response to the pressure on the inlet side of the valve assembly exceeding a threshold value. In a preferred embodiment of the present invention, the second valve member is a pressure-relief valve. The pressure-relief valve preferably includes a valve seat and a weighted member coupled to the valve seat, the weighted member being lifted away from the valve seat in response to the pressure on the inlet side of the valve assembly exceeding the threshold value. The valve assembly also preferably defines a drain hole for permitting the passage of fuel, gases, and vapors through the valve assembly when the first and second valve members are preventing the passage of fluid through the first and second fluid passageways.

In a preferred embodiment of the present invention, the apparatus comprises two valve assemblies, the first valve assembly being coupled between the fuel tank and the vent container, and the second valve assembly being coupled between the vent container and the vent port.

In another embodiment of the present invention, the apparatus further comprises a fill tube seated within the first aperture of the fill container and extending into the interior of the fill container for receiving the nozzle to fill the fuel tank with fuel. The fill tube preferably includes a plurality of apertures for permitting the passage of fuel, vapors and gases between the fill tube and the interior of the fill container. The apparatus of the present invention preferably further comprises a fill plug for seating within the second aperture of the fill container, to close the second aperture and remove the fill container from the vessel without spilling any fuel. The first aperture is preferably dimensioned to permit the fill plug to be passed therethrough to seat the fill plug within the second aperture. In one embodiment of the present invention, the fill plug includes a liquid-displacement portion which projects into the fuel fitting upon seating the fill plug within the second aperture. The liquid-displacement portion displaces the fuel in the top of the fuel fitting into the fill container to further prevent the spillage of fuel upon removal of the fill container.

Another embodiment of the present invention includes a by-pass line coupled between the fill container and the overflow reservoir to permit the passage of any backed-up fuel entering the fill container to flow through the by-pass line and into the overflow reservoir. In this embodiment, the fill container is mounted below the deck of the vessel, and the apparatus preferably includes an indicator system for signaling to an attendant when the fuel tank is filled with fuel. The indicator system may comprise a float-activated visual indicator, which is driven upwardly through the fuel fitting on the vessel in response to the entry of overflow or backed-up fuel into the fill container.

One advantage of the apparatus of the present invention, is that the valve assembly prevents any overflow fuel from the fuel tank from spilling through the vent port into the water. Rather, once the fuel tank is filled, the overflow fuel flows into the fill container, signaling to the attendant to turn off the nozzle. The drain hole in the valve assembly then permits the excess fuel to slowly pass through the valve assembly and into the vent container, which in turn permits the overflow fuel in the fill container and fuel fill hose to drain into the fuel tank. The attendant can then simply remove the empty fill container and close the fuel fitting without spilling any fuel, or when the fill container is mounted below deck, simply close the fuel fitting. If for some reason the drain hole in the valve assembly becomes blocked, or the excess fuel is not otherwise permitted to pass through the valve assembly into the vent container, then the second aperture on the fill container is closed, preferably with the fill plug, and the fill container with the overflow fuel is removed from the vessel, or when the fill container is mounted below deck, any such excess fuel flows into the overflow reservoir through the by-pass line. Thus, with the apparatus of the present invention, a fuel tank can be filled on any type of vessel without spilling the fuel either into the water or onto the vessel. The apparatus of the present invention also prevents spillage of fuel when there is thermal expansion or agitation of the fuel in rough seas.

Other advantages of the apparatus of the present invention will become apparent in view of the following detailed description and accompanying drawings.

DETAILED DESCRIPTION

Figure 1:
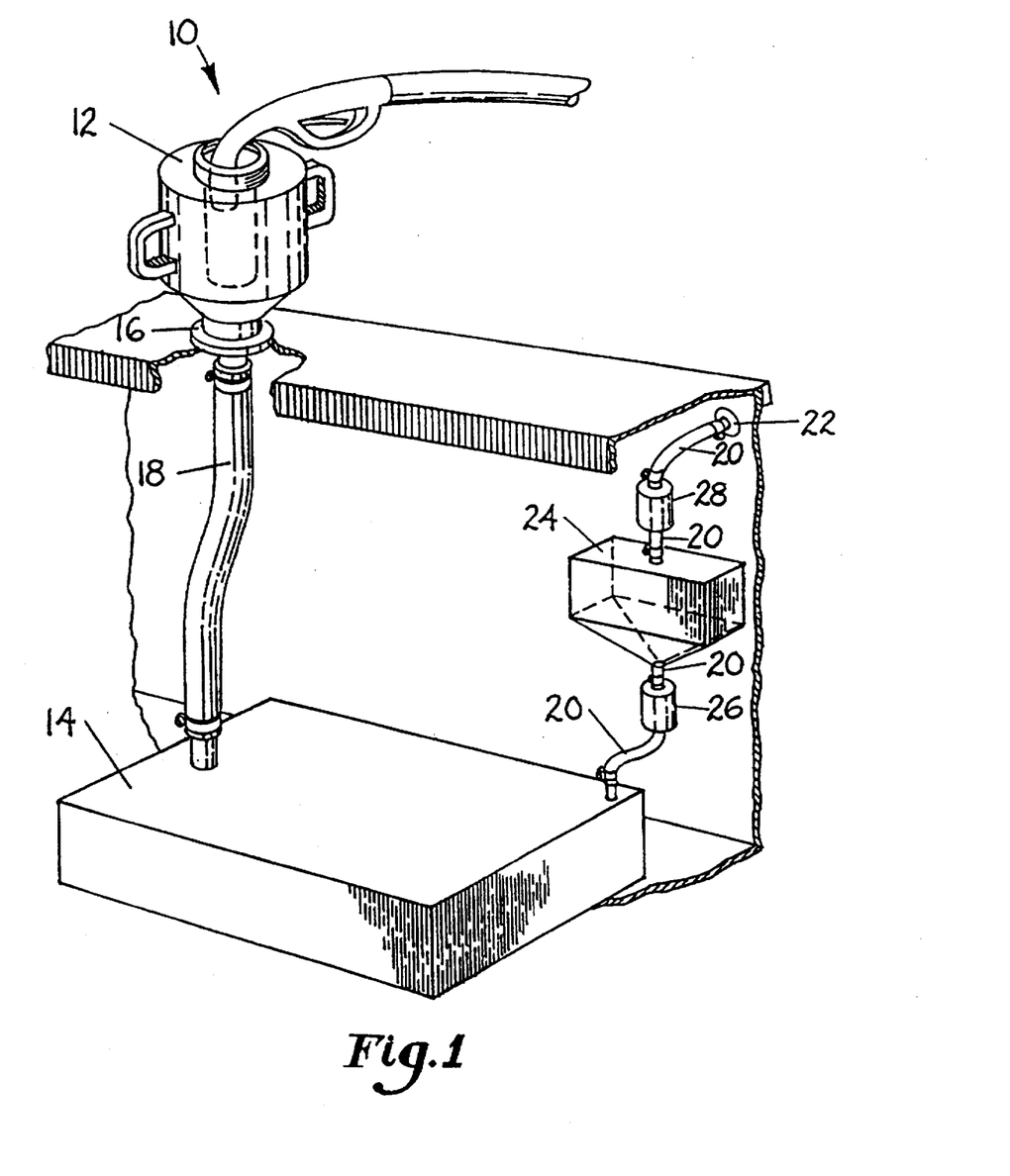
FIG. 1 is a perspective view of an apparatus embodying the present invention for preventing the spillage of fuel from a marine vessel.

In FIG. 1, an apparatus embodying the present invention is indicated generally by the reference numeral 10. The apparatus 10 includes a fill container 12, which is provided for collecting any excess fuel when filling a fuel tank 14 of the vessel. The fill container 12 is seated within a fuel fitting 16 located on the vessel, which is coupled by a fill hose 18 to the fuel tank 14. A vent hose 20 is coupled on one end to the fuel tank 14 and is coupled on the other end to a vent port 22, which is located in the side of the vessel above the water line. A vent container 24, lower valve assembly 26, and upper valve assembly 28 are coupled within the vent line 20 for preventing any fuel from escaping through the vent line and into the water, as is described further below. It is noted that although the apparatus of the present invention is described with reference to a fuel system on a marine vessel, it is equally adaptable for use with other types of fuel systems for preventing spillage, such as underground fuel tanks.

Figures 2, 3:
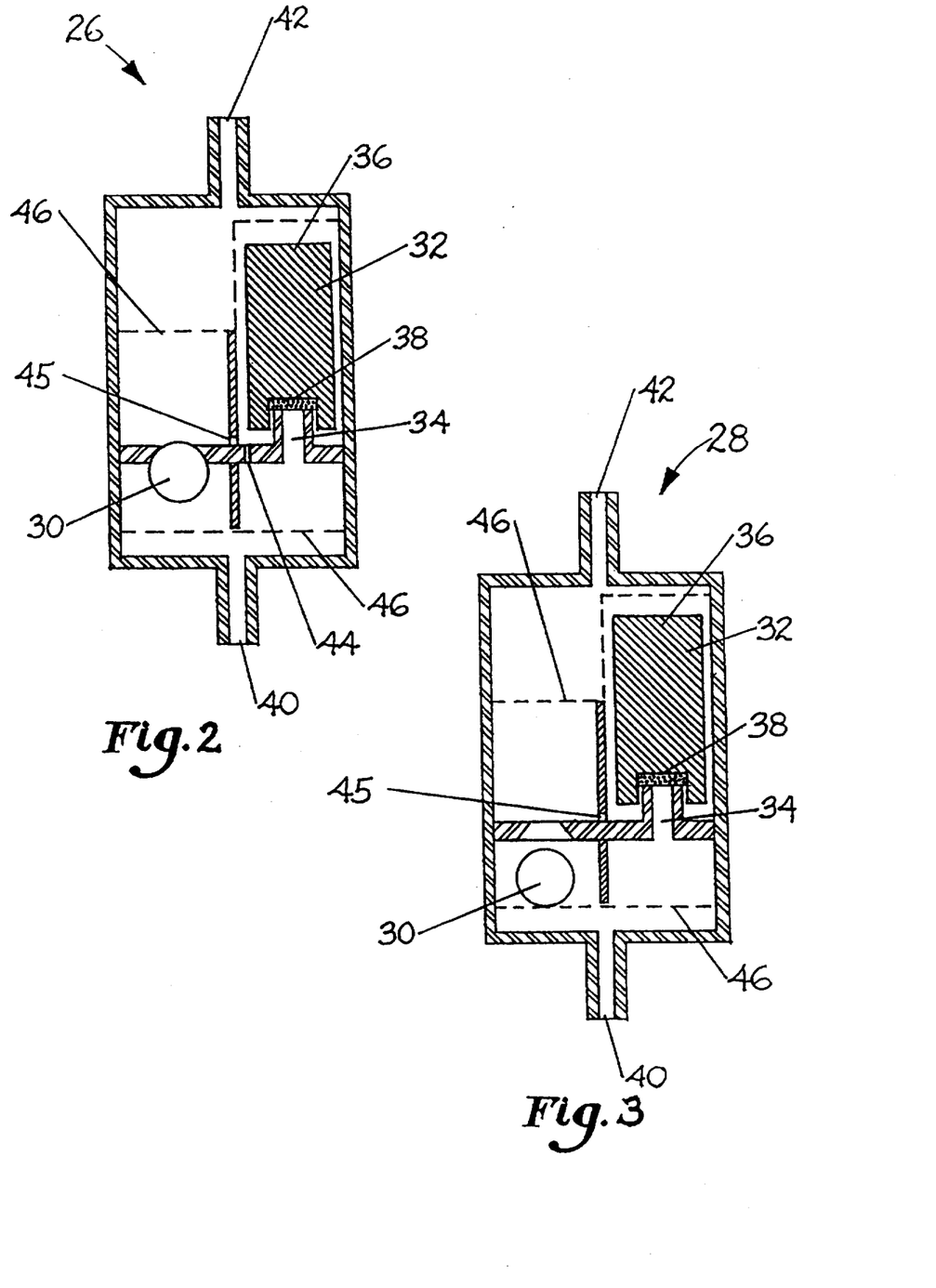
FIG. 2 is a cross-sectional view of the lower valve assembly of the apparatus of FIG. 1.
FIG. 3 is a cross-sectional view of the upper valve assembly of the apparatus of FIG. 1.

The lower valve assembly 26 is illustrated in further detail in FIG. 2, and is provided to prevent any significant flow of fuel into the vent container 24. The valve assembly 26 includes two channels, one channel includes a ball valve 30 and the other channel includes a pressure-relief valve 32. The pressure-relief valve 32 includes a valve seat 34, a weighted member 36 defining a recess for receiving the valve seat 34, and a gasket 38 located within the recess. The lower valve assembly 26 also includes an inlet port 40, an outlet pore 42, a first drain hole 44 located next to the pressure-relief valve 32, and a second drain hole 45 formed within the wall between the ball valve 30 and the pressure-relief valve 32. The drain holes are provided to permit small quantities of fuel, gases and vapors to flow through the valve assembly when the valve assembly is closed, as is described further below.

In the normally closed position of the pressure-relief valve 32, as shown in FIG. 2, the weighted member 36 and gasket 38 are seated against the valve seat 34, thus closing the valve. The weighted member 36 is indexed to permit the opening of the pressure-relief valve 32 when the pressure on the inlet port 40 exceeds the pressure on the outlet port 42 by a threshold quantity. In the embodiment of the present invention illustrated, this threshold is approximately 2.5 to 3 psi. As will be recognized by those skilled in the art, this pressure setting may vary depending upon the particular fuel system.

When fuel flows from the fuel tank 14 into the inlet port 40, the ball valve 30 is closed, thus closing the valve assembly 26, and permitting the fuel, gases and/or vapors to slowly pass only through the first drain hole 44 and second drain hole 45 into the vent container 24. Only if the pressure on the inlet side of the valve assembly 26 exceeds 2.5 psi (or other threshold setting), does the pressure-relief valve 32 open and permit the fuel and/or vapors to flow freely from the fuel tank 14 into the vent container 24. As also shown in FIG. 2, the valve assembly 26 includes screens 46 on either side of the ball valve 30 and pressure-relief valve 32 to prevent debris from interfering with the operation of the valves.

In FIG. 3, the upper valve assembly 28 is illustrated in further detail. The upper valve assembly 28 is essentially the same as the lower valve assembly 26, except that the valve assembly 28 does not include a drain hole 44. The same reference numerals are therefore used to indicate the components of the upper valve assembly 28 corresponding to the same components of the lower valve assembly 26. The upper valve assembly 28 is provided as a safety back-up valve. If the overflow of fuel does reach the upper valve assembly 28, the upper ball valve 30 closes and prevents the fuel from flowing through the vent port 22 and into the water. Only excessive over-pressure (e.g., greater than 2.5 psi, or other pressure-relief setting) will open the upper pressure-relief valve 32.

Figure 4:
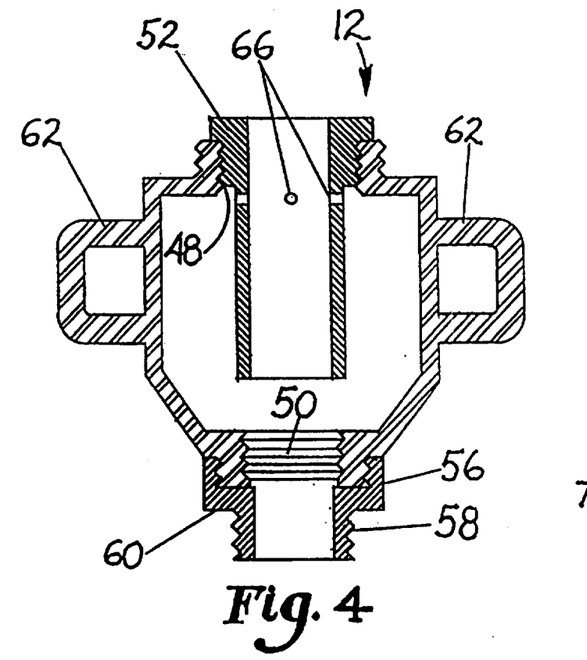
FIG. 4 is a cross-sectional view of the fill container of the apparatus of FIG. 1 illustrating the fill tube mounted within the container for receiving a fuel nozzle to fill the fuel tank with fuel.
Figure 5:
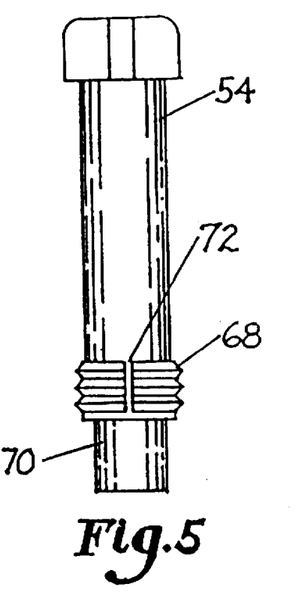
FIG. 5 is an elevational view of the fill plug of the apparatus of FIG. 1.
Figure 6:
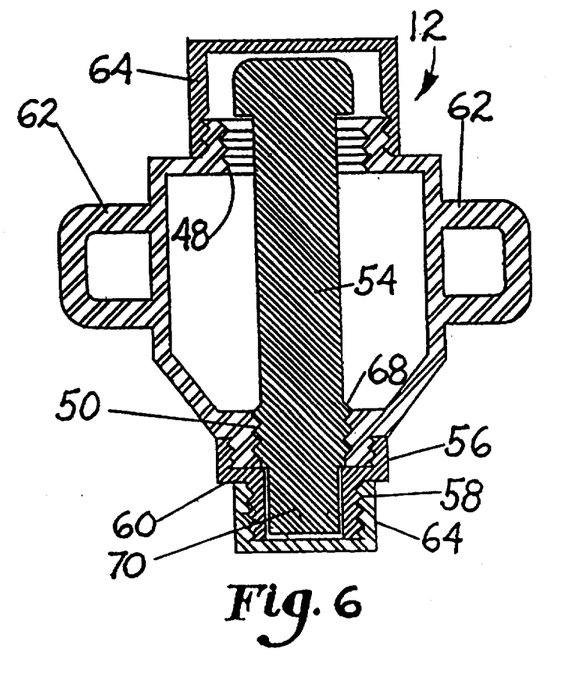
FIG. 6 is a cross-sectional view of the fill container of the apparatus of FIG. 1 illustrating the fill plug seated within the bottom of the fill container to seal the container.
Figure 7:
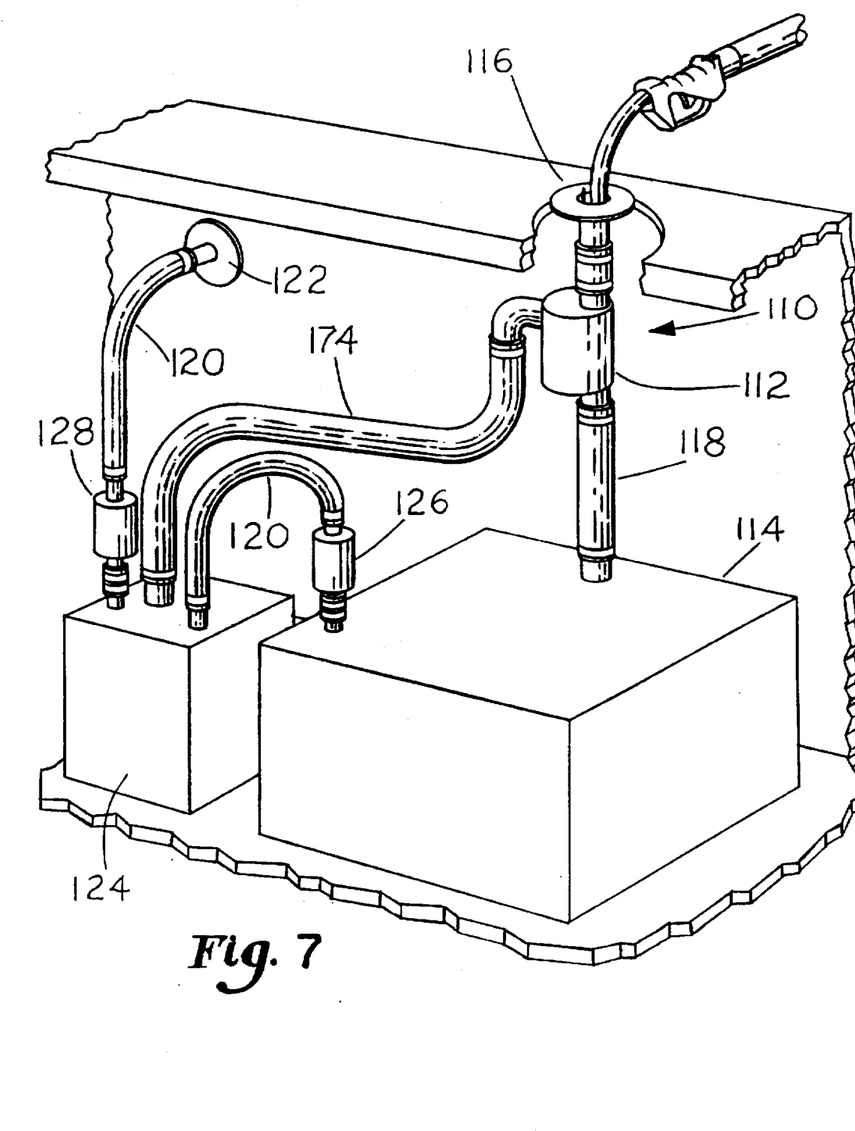
FIG. 7 is a perspective view of another embodiment of an apparatus embodying the present invention for preventing fuel spillage.

Turning to FIG. 4, the fill container 12 is shown in further detail, and defines a first threaded aperture 48 on one end of the container, and a second threaded aperture 50 on the other end of the container. The first threaded aperture 48 is provided to receive a fill tube 52, and the second threaded aperture 50 is provided to receive a fill plug 54, as shown in FIGS. 5 and 6. The bottom side of the fill container 12 includes a fuel-fitting adapter 56, which includes a male-fitting portion 58 shaped to be seated within the fuel fitting 16 on the vessel. A gasket member 60 is seated around the male-fitting member 58 to seal the interface between the fuel-fill adapter 56 and the fuel fitting 16 on the vessel. The male-fitting member 58 may be threaded as shown in FIG. 4, if there are corresponding female threads on the fuel fitting 16 of the vessel. A pair of handles 62 are provided on the sides of the fill container 12, and a pair of end caps 64 are provided for closing the open ends of the fill container 12 when not in use, as shown in FIG. 6.

When filling the fuel tank 14, the end caps 64 are removed, the fill tube 52 is threaded into the first threaded aperture 48, as shown in FIG. 4, and the male fitting 64 is seated within the fuel fitting 16 on the vessel, as shown in FIG. 1. The attendant can use the handles 62 to rotate the male fitting 58 of the fill container 12 into the fuel fitting 16 to securely seat the fill container in place. The attendant then inserts the nozzle into the fill tube 52 and begins to pump the fuel, as shown in FIG. 1. When the fuel tank 14 becomes full, the fuel then flows into the vent line 20 and inlet port 40 of the lower valve assembly 26, and in turn closes the ball valve 30. Both the pressure-relief valve 32 and ball valve 30 are then closed, permitting the fuel to slowly pass only through the drain hole and in turn through the drain hole 45 and into the vent container 24. Because the system is being filled with fuel relatively rapidly (typically about 30 gallons per minute) and the drain hole 44 is relatively small, the fuel then quickly backs up into the fill container 12, signaling to the attendant to turn off the nozzle.

As shown in FIG. 4, the fill tube 52 includes several spaced holes 66 to permit air to mass up through the fill tube 52 and into the fill container 12, and thus prevent any fuel from flowing directly up the fill tube and out of the container. Because of the pressure differential created by the overflow fuel in the fill container 12, fuel slowly passes through the drain hole 44 and into the vent container 24, which in turn permits the overflow fuel in the fill container 12 to drain into the fill hose 18. The attendant then simply removes the empty fill container 12 and closes the fuel fitting 16 without spilling any fuel.

The pressure-relief valve 32 typically does not lift because the pressure at any point in an open system (i.e., with the fuel fitting 16 open) is based on the difference in height between the level of fuel in the fill container 12 and the point in the system. The pressure-relief setting of the valve 32 (and/or the installation height of the valve 32) is selected so that the pressure at the valve 32 is normally significantly below the pressure-relief setting (e.g., 2.5 to 3 psi) when the fill container 12 is partially filled with fuel. If, however, the pressure within the system exceeds the threshold pressure of the pressure-relief valve 32, the valve opens and the fuel is permitted to flow into the vent container 24. The upper valve assembly 28 then prevents the fuel from flowing beyond the vent container 24, unless the pressure within the vent container exceeds the pressure setting of the upper pressure-relief valve 32.

If for some reason the overflow fuel does not drain from the fill container 12 into the system (e.g., if the drain hole 44 becomes blocked), then the attendant removes the fill tube 52 from the fill container 12, and inserts the fill plug 54 into the second threaded aperture 50 on the bottom of the fill container 12, as shown in FIGS. 5 and 6. The threaded plug 54 includes a threaded portion 68, which is screwed into the threaded aperture 50 to seal the bottom of the fill container 12. The fill container 12 can then be removed from the fuel fitting 16 without spilling any of the fuel. As also shown in FIGS. 5 and 6, the fill plug 54 includes a liquid-displacement portion 70 located below the threaded portion 68, which is provided to displace some of the fuel within the fuel fitting 16 into the fill container 12 when the fill plug 54 is inserted. Several channels 72 are formed within the threaded portion 68 to facilitate the flow of fuel from the fuel fitting into the fill container. Thus, when the fill container 12 is removed from the vessel, the fuel level within the fuel fitting 16 will be below the top of the fuel fitting, thus further preventing the spillage of fuel if the vessel is rocked before the fuel fitting is closed.

Accordingly, a significant advantage of the apparatus of the present invention, is that the fuel tank 14 can be filled without spilling any fuel onto the vessel or into the water. The vent container and valve arrangement within the vent line also prevents any fuel from spilling into the water if there is thermal expansion of the fuel or agitation of the fuel in rough seas. As the level of fuel in the fuel tank 14 decreases, then any fuel in the vent container 24 is permitted to flow through the ball valve 30 and back into the fuel tank. The unique design of the fill container and fill plug also prevents any fuel from overflowing from the fill hose and spilling onto the vessel or into the water when the fuel tank is filled.

Turning to FIGS. 7–10, another embodiment of the present invention is indicated generally by the reference numeral 110. The apparatus 110 is similar in many respects to the apparatus 10 described above, and therefore like reference numerals preceded by the numeral 1 are used to indicate like elements. The apparatus 110 differs from the apparatus 10 in that the fill container 112, which defines a smaller volume in comparison to the fill container 12 described above, is mounted below the deck, and a by-pass line 174 is coupled between the fill container and the vent container or overflow reservoir 124 for accommodating overflow fuel entering the fill container, as is described further below.

Figure 8:
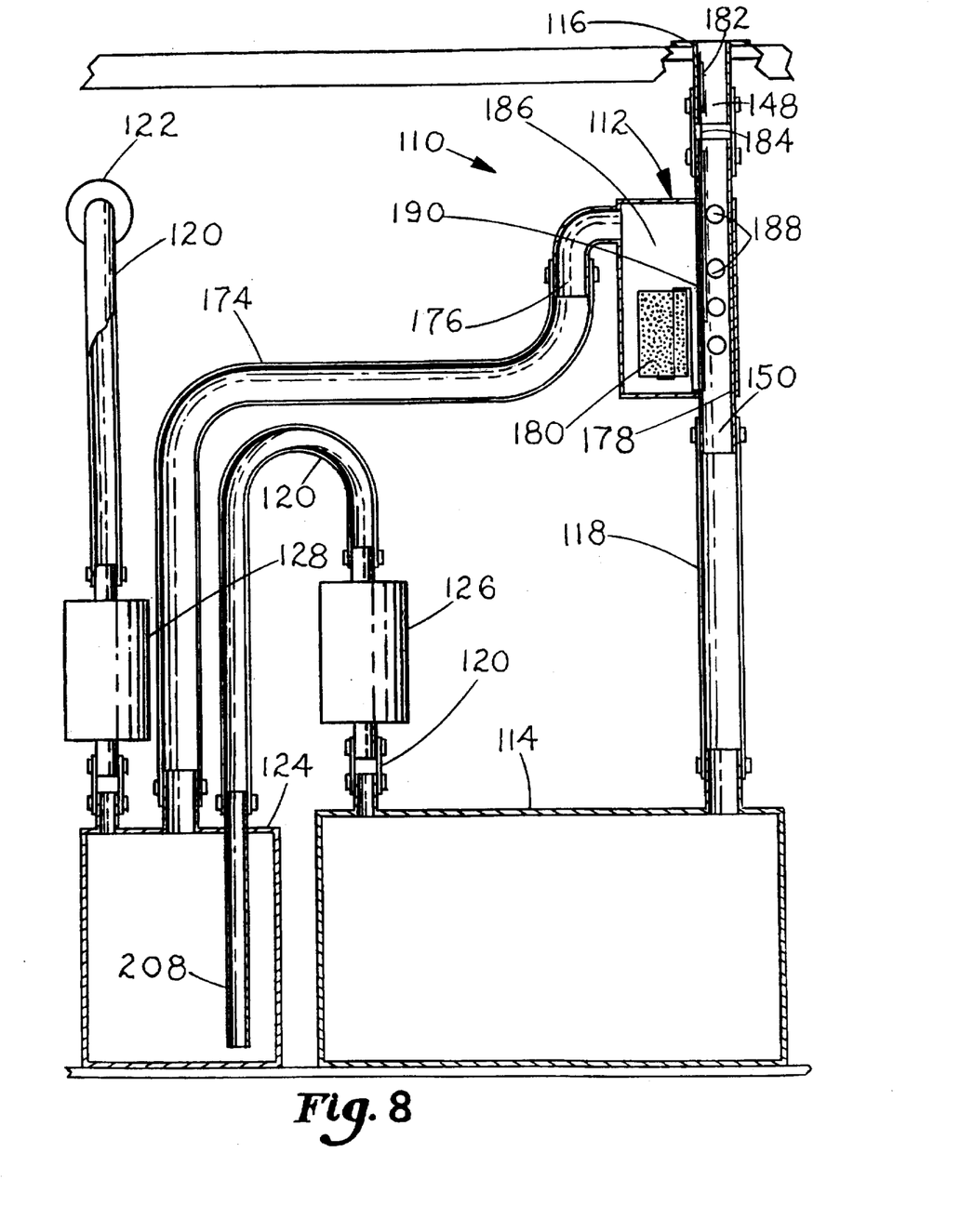
FIG. 8 is a partial cross-sectional view of the apparatus of FIG. 7, illustrating in further detail the under-deck fill container and by-pass line for the passage of overflow fuel from the fill container into the overflow reservoir.

As shown in FIG. 8, the fill container 112 includes an inlet port 148 coupled to the fuel fitting 116, a first outlet port 150 coupled to the fill hose 118, and a second outlet port 176 coupled to the by-pass line 174. The fill container also defines a substantially tubular portion 178 extending between the inlet port 148 and first outlet port 150, thus defining a relatively slender shape facilitating ease of installation in a variety of vessels.

As also shown in FIG. 8, the fill container includes an indicator system for indicating to an attendant when the tank 114 is filled with fuel, which includes a float 180 coupled to a visual indicator 182 by means of a rigid wire 184. The fill container 112 defines a float chamber 186 formed between the second outlet port 176 and the tubular portion 178 for receiving the float 180. The float chamber 186 is coupled in fluid communication with the tubular portion by means of a plurality of apertures 188 formed through a wall separating the tubular portion and the float chamber for receiving overflow fuel entering the fill container. An elongated slot 190 is also formed through the wall separating the float chamber and the tubular portion for receiving the wire 184 and permitting movement of the indicator system upwardly toward the fuel fitting 116 in response to the flow of overflow fuel into the fill container. The indicator 182 is made of an elongated strip of plastic or metal, which can be visually recognized by an attendant when driven upwardly through the fuel fitting 116 in response to the introduction of overflow or backed-up fuel into the fill container, as is described further below.

Figure 9:
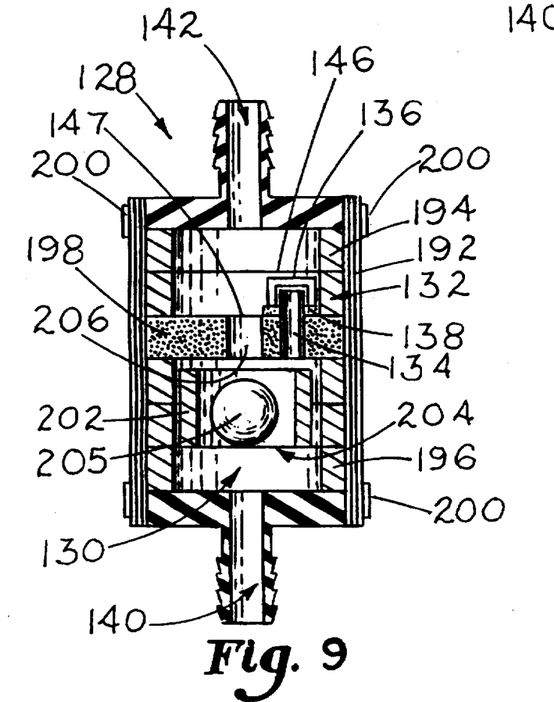
FIG. 9 is a cross-sectional, elevational view of the lower valve assembly of the apparatus of FIG. 7 with the central axis of the valve assembly tilted about 30° toward the surface of the paper.
Figure 10:
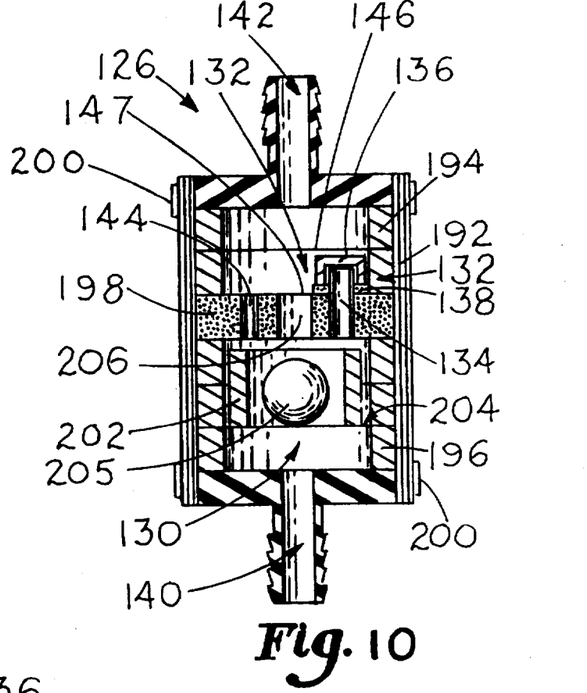
FIG. 10 is a cross-sectional, elevational view of the lower valve assembly of FIG. 9.

As shown typically in FIGS. 9 and 10, each valve assembly 126 and 128 is formed principally of substantially tubular components in order to reduce manufacturing costs, and provide a relatively slender shape for facilitating ease of installation in a variety of vessels. Although only the lower valve 126 is illustrated in detail, the upper valve is identical to the lower valve in all respects, except that the upper valve does not include a drain hole 144 for permitting the passage of overflow fuel and gases through the valve.

The lower valve 126 includes a tubular outer wall 192 formed in this instance by a section of fuel hose, which may be the same type of tubing as used for the fuel hose 118. The lower valve also includes an inner wall defined by an upper plastic tube 194 and lower plastic tube 196, both slidably received within the outer wall tubing 192. A plastic valve seat 198 is seated between the upper and lower inner tubes, and the valve seat and inner wall tubes are fixed in place by a pair of metal clamps 200, each metal clamp being wrapped around the outer wall tubing adjacent to either the upper or lower inner tube.

The ball valve 130 includes a ball housing formed by another section of cylindrical plastic tubing 202, the outer surface of which is spaced inwardly relative to the lower inner wall tubing 196, and defines an annular passageway 204 for the passage of fuel and/or vapors around the ball valve. The lower screen 146 covers the end of the ball housing 202 and the entrance to the annular passageway 204 to prevent the passage of debris through the valve, and to retain the ball 205 within the housing 202. The plastic valve seat 198 defines a central aperture 206 extending therethrough for receiving the ball 205 to close the ball valve, and for the passage of fuel therethrough when the ball valve is open.

As also shown in FIGS. 9 and 10, the valve seat 134 for the pressure-relief valve 136 is formed by a section of cylindrical metal tubing extending through the plastic seat 198 and projecting upwardly into the recess of the weighted member 136. The gasket 138 is formed by a plastic washer seated around the metal tubing 134, and interposed between the weighted member 136 and plastic seat 198. The drain hole 144 is also formed by a piece of cylindrical metal tubing extending through the plastic seat 198. Another screen 146 covers the entrance to the upper plastic tube 194 to prevent the passage of debris through the other side of the valve, and a wider mesh screen 147 covers the top surface of the valve seat 198 to provide structural support. In the embodiment of the invention illustrated, the inner wall tubing and ball housing are each made of FRP tube, the plastic washer is made of polyurethane, and the metal tubes and screens are made of stainless steel. These particular materials are only exemplary, however, being selected based on considerations of availability, cost and durability, and as will be recognized by those skilled in the art numerous other materials may be employed.

In the operation of this embodiment of the present invention, an operator fills the fuel tank 114 with fuel by inserting a fuel nozzle (not shown) into the fuel fitting 116 and introducing the fuel through the fuel hose 118 and into the tank. When the tank is full, the fuel enters the vent line 120 and flows into the inlet port 140 of the lower valve 126. The overflow fuel causes the ball valve 130 to close by driving the ball 205 against the valve seat 198, which in turn blocks the aperture 206. Both the pressure-relief valve 132 and ball valve 130 are then closed, permitting the fuel to slowly pass only through the drain hole 144 into the overflow reservoir. Because the system is filled with fuel relatively rapidly (typically about 30 gallons per minute) and the drain hole 144 is relatively small in diameter, the fuel then quickly backs up into the fill line 118 and fill container 112.

The backed-up fuel enters the lower portion of the fill container causing the float 180 to rise, and in turn drives the visual indicator 182 upwardly through the opening of the fuel fitting 116 and exposing the indicator to the attendant. If the attendant does not shut off the fuel nozzle immediately, the fuel continues to flow into the fill container, through the second outlet port 176 and by-pass line 174, and into the overflow reservoir 124. Preferably, the vent line 120 defines an end portion 208 illustrated in dashed lines in FIG. 8, which projects into the reservoir 124 and terminates immediately above the base of the reservoir. In this way, any overflow fuel in the reservoir is drawn back into the main fuel tank 114 as the engines require fuel. Because the line 208 terminates near the bottom of the reservoir, air is not permitted to enter the vent line until the reservoir is empty. Because of the pressure differential created by the backed-up fuel in the fill hose 118 and fill container 112, fuel slowly passes through the drain hole 144 and into the overflow reservoir 124, which in turn permits the fuel in the fill container and fill hose to drain downwardly toward the fuel tank.

One advantage of this embodiment of the present invention, is that the fill container is relatively small, and is preferably designed to capture only enough fuel to float the visual indicator. In this embodiment, the fill container holds about 6 to 8 liquid ounces for performing this function, and the fill bottle itself is about 4 inches in maximum diameter, and about 7 inches long. Any excess overflow fuel is by-passed through the fill container to the by-pass line and into the reservoir, which, in effect, operates as a small fuel tank when holding the overflow fuel. Because the by-pass feature permits the fill container to be significantly reduced in size, the ease of installation of the apparatus in a variety of vessels, particularly smaller vessels, is enhanced. Depending upon the size of the fuel tank and/or the vessel, the volume of the overflow reservoir can be designed to provide plenty of time for an operator to shut-off the fuel nozzle before the reservoir is filled with overflow fuel.

This description of the preferred embodiments of the present invention is to be taken in an illustrative, as opposed to a limiting sense. For example, it may be desirable to provide the indicator system with an audible alarm activated by the float, for example, instead of the visual indicator only. It may likewise be desirable to form the overflow reservoir as an integral part of the main fuel tank in new installations, wherein the fuel tank would be defined by a first compartment and the overflow reservoir would be defined by a second smaller compartment. Thus, as will be recognized by those skilled in the pertinent art, numerous modifications may be made to these and other embodiments of the present invention without departing from the scope of the appended claims.

What is claimed is:

1. A method for preventing fuel spillage during and after refueling on a marine vessel having a fuel inlet port for receiving a fuel nozzle for supplying fuel, a fuel tank including a fuel chamber coupled in fluid communication with the fuel inlet port, a fuel fill line coupled in fluid communication to the fuel inlet port and to the fuel tank, and a vent port coupled in fluid communication to the fuel tank, comprising the steps of:

supplying fuel through the fuel inlet port, and in turn through the fuel fill line and into the fuel chamber of the fuel tank;

preventing further fuel flow into the fuel chamber upon filling the fuel chamber with fuel and in turn causing the fuel to backup into the fuel fill line;

draining the fuel from the fuel fill line downwardly into an overfill chamber coupled in fluid communication with the fuel chamber;

preventing the passage of fuel from the overfill chamber and fuel chamber through the vent port;

and draining the fuel from the overfill chamber into the fuel chamber in response to removal of fuel from the fuel chamber.

2. A method as defined in claim 1, comprising the additional steps of preventing fuel flow in the direction from the fuel chamber toward the overfill chamber and in turn causing fuel to back up into the fuel fill line.

3. A method as defined in claim 2, further comprising the step of generating a signal to indicate the presence of backed-up fuel in the fuel fill line upon filling the fuel chamber with fuel.

4. A method as defined in claim 2, further comprising the step of routing backed-up fuel from the fuel fill line to the overfill chamber upon filling the fuel chamber with fuel.

5. A method as defined in claim 2, further comprising the step of permitting fluid flow from the fuel chamber to the overfill chamber in response to a pressure in the fuel chamber exceeding a pressure in the overfill chamber by more than a preset amount.

6. A method as defined in claim 2, where the marine vessel includes a fill chamber coupled in fluid communication with the fuel inlet port, the fuel fill line, and a bypass line leading to the overfill chamber, and the method further comprises the step of receiving in the bypass line backed-up fuel from the fuel fill line and permitting the same to drain through the bypass line to the overfill chamber.

* * * * *